United States Patent Office 2,804,739
Patented Sept. 3, 1957

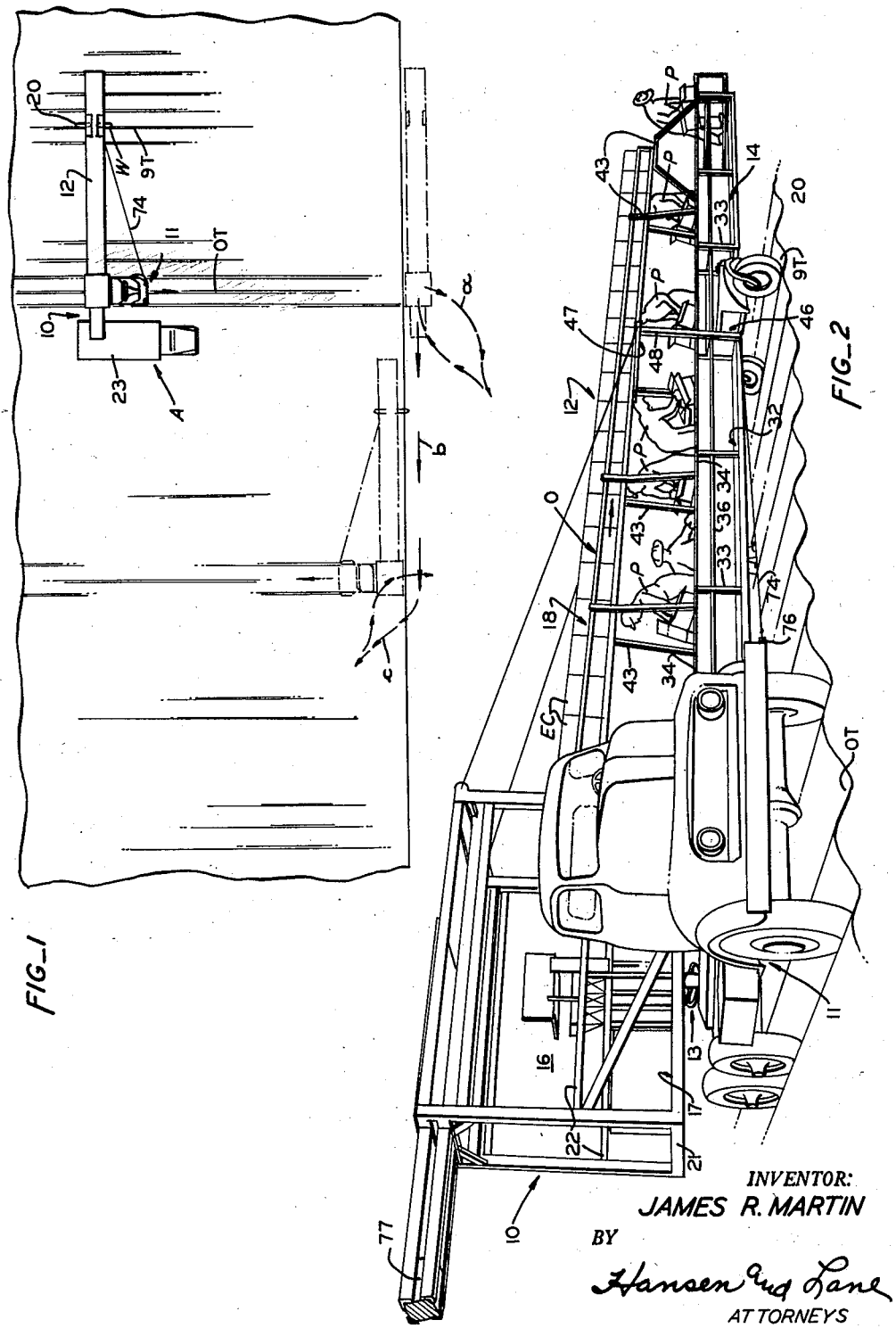

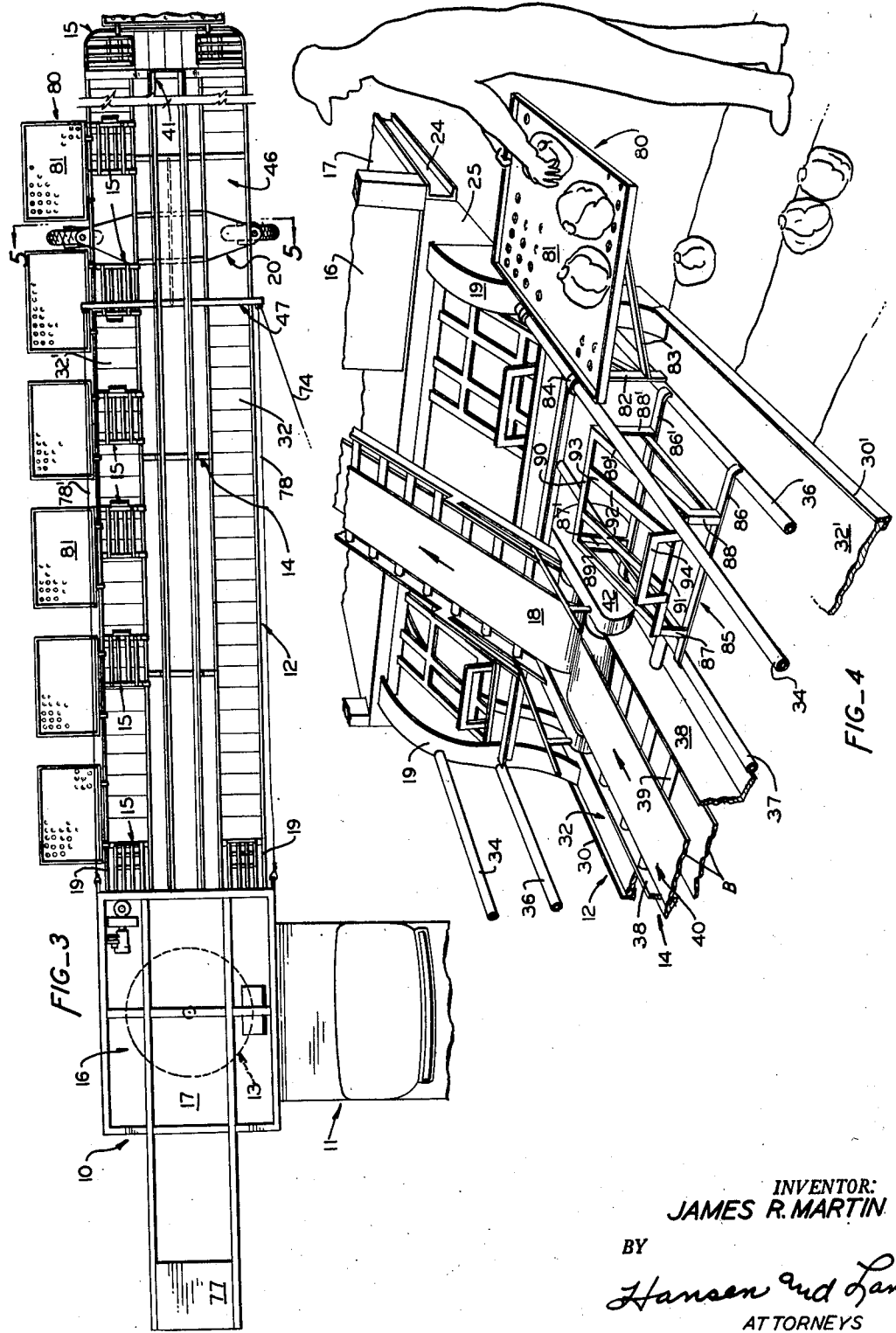

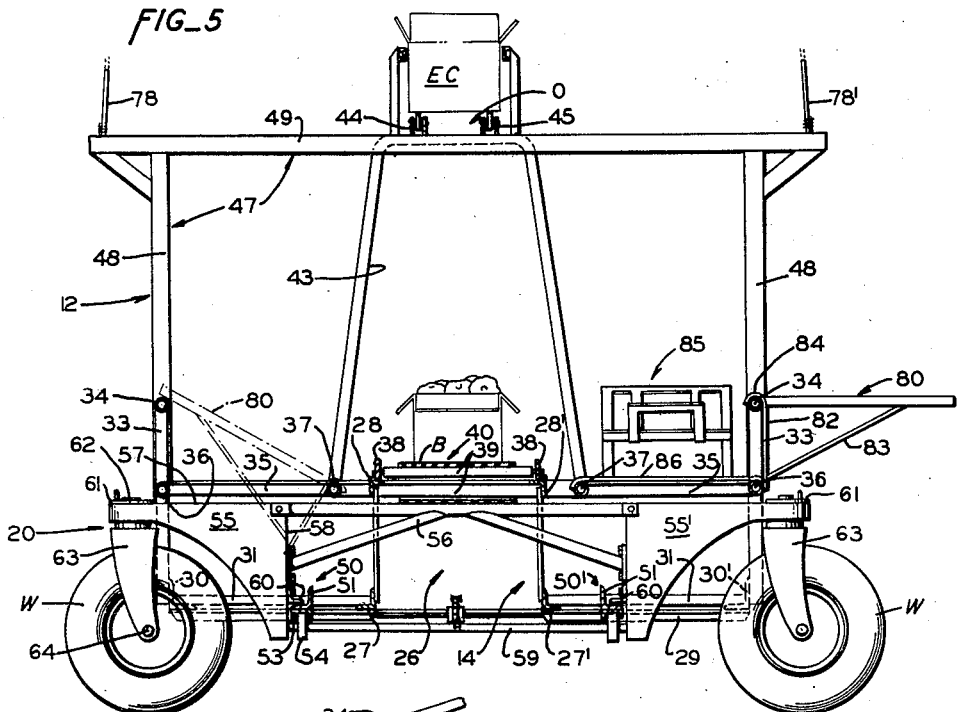
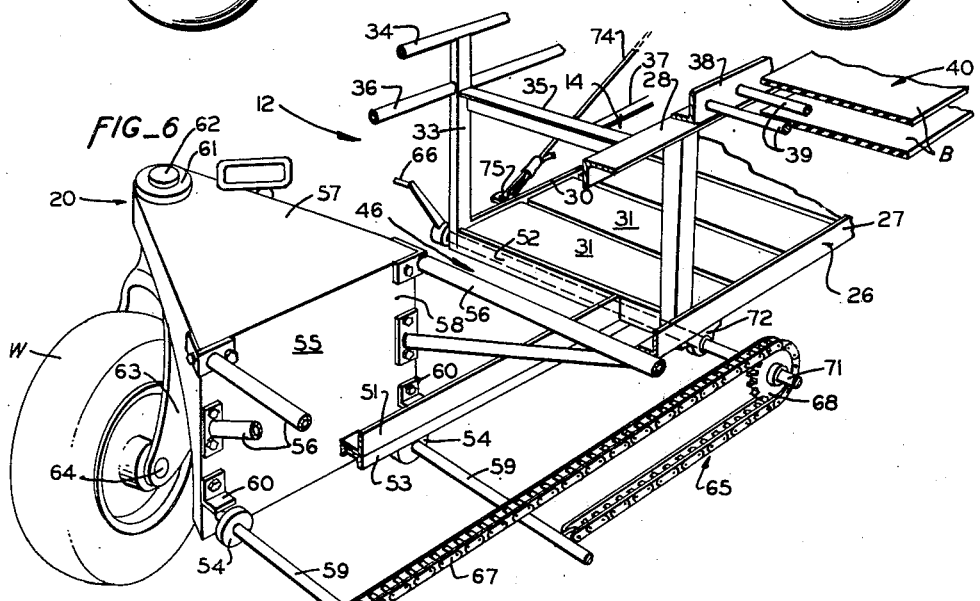

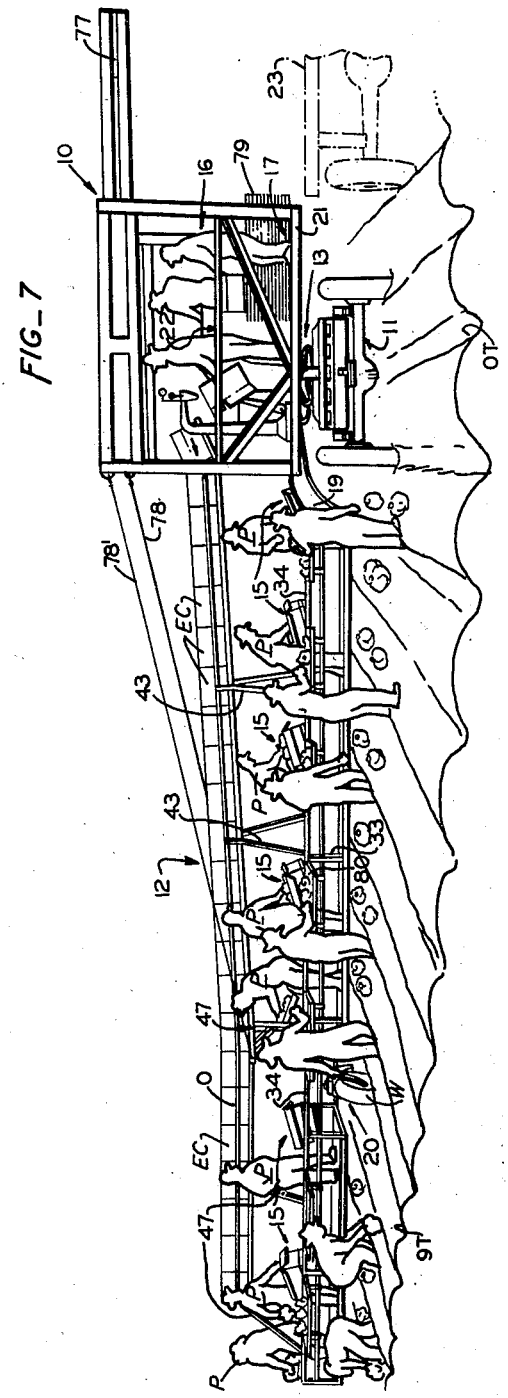

2,804,739

MOBILE FIELD TYPE PACKING PLANT

James R. Martin, Salinas, Calif.

Application September 13, 1954, Serial No. 455,527

5 Claims. (Cl. 53—391)

This invention relates to agricultural vehicles and more especially to an apparatus and arrangement by which access to a wide span of row crops in a field is facilitated by a plurality of men such as laborers, packers and the like. In particular, this invention is directed to a field type packing plant. It was conceived for the purpose of alleviating unnecessary duplication of handling of crops and to speed up the packing of crops in a manner to obtain a steady flow of produce from the field to the packers and thence to a vehicle for transfer to market.

Heretofore it has been the practice to cut head lettuce in the field and to load the cut heads, either manually or mechanically, into crib type racks on a truck for transport to a packing shed. In the packing sheds men and women are employed in trimming, wrapping and packing the head lettuce. By this method the heads of lettuce were packed in strata with cracked ice between each layer of produce and the filled crates loaded into refrigerator cars for transport to market. Obviously this prior practice entailed duplicity of handling of each head of lettuce, first by the cutter, then the pick-up man who placed the lettuce into the crib or on a conveyor for elevation into the crib. Then at the packing shed the lettuce must be handled by a trimmer, a wrapper, and ultimately the packer and icer. It will therefore be appreciated that much of the outside leaf is lost through bruising and trimming and that there is a considerable lapse of time between the hour of picking or cutting of the head and the time when it is finally packed in the crate with ice.

Up until a year or so ago almost all lettuce was picked, handled and packed in crates in the manner just explained. Up to that time it was inconceivable that head lettuce could be packed and shipped in corrugated cardboard cartons because of the profuse presence of water on the lettuce and the known deteriorating effects of water on such cartons. Since that time, however, it was conceived that by eliminating the cracked ice and by cooling the heads of lettuce very soon after cutting, followed promptly by loading of same into refrigerator cars, cartons of a paper base are suitable and in fact preferable. Moreover, smaller packages can be shipped and retail merchants can take smaller shipments at more frequent intervals to the end that they can obtain fresh lettuce daily rather than be caught with hold-over heads which perish fast resulting in great loss. As a result of this innovation, a far greater percentage of lettuce is now being packed and shipped by this new method rather than the crate and ice method previously explained.

With the foregoing background, it is believed that the benefits and advantages of the mobile, field type packing plant of the present invention will be better understood and appreciated. As a forerunner of the apparatus embodying the present invention, reference is made to my co-pending U. S. application, Serial No. 385,436, filed October 12, 1953, now Patent No. 2,699,277, on a Lettuce Loader Rig. This earlier filed application serves, on a smaller scale, the purpose of facilitating field packing of lettuce in cardboard cartons and the direct transmittal of filled, packed cartons to heat extracting tunnels under the new method for prompt loading of the cooled produce into refrigerator cars. The mobile field type packing plant of the present invention contemplates the provision of a wheeled vehicle facilitating coverage of a wide span of plant beds giving ample elbow room for workmen on the field as well as on the vehicle to assure a maximum of packaging in a minimum of time.

With the foregoing in mind it is an object of this invention to provide a vehicle in which an elongated trailer is connected by a turntable arrangement to a tractor for movement in alignment therewith as well as laterally with respect thereto. In this connection, the trailer is provided with a pair of casters on each of its sides and adjacent its rear end to facilitate movement of the trailer in alignment with the tractor during transport on a public highway and for movement as a lateral extension from the tractor transversely of row crops in the field.

It is another object to provide a caster carriage shiftable longitudinally of the trailer to register the caster wheels with trenches or pathways dividing the beds in which the row crops are grown.

Another object is to provide a counterbalanced boom-like frame of said trailer to counteract the normal weight thereof at its rearmost end in the region of the caster carriage.

It is another object of this invention to provide a conveyor system on the elongated trailer for receiving and feeding cartons from and to a station on the tractor and above the turntable connection thereof with the trailer.

A further object of this invention is to provide a mobile packing plant incorporating a central stitching and carton handling station on the bed of a truck or tractor so situated as to enable parallel travel thereof alongside a supply truck for receiving empty cartons therefrom and for discharging filled cartons thereto in combination with an elongated counter-balanced lateral boom disposed to travel transversely of and over row crops and to provide catwalks and loading equipment for men on board as well as trays on which lettuce can be deposited adjacent the loading equipment by men in the field.

Yet another object of this invention is the provision of a lateral conveyor on a mobile packing plant having inversely interchangeable loading equipment and trays so constituted as to facilitate packing of lettuce directly from the field irrespective of either left or right hand extension of the lateral conveyor relative to the tractor of the mobile unit.

Still another object is to provide a lateral conveyor boom on a mobile packing plant having a central conveyor system bordered fore and aft by catwalks, the trailing one of which carries a plurality of packing stations and produce receiving trays. In connection with this feature it is an object to provide movable packing racks interchangeable to either catwalk of the lateral conveyor boom to facilitate packing of produce from either side of such boom dependent upon its direction of movement.

These and other objects of the present invention will become apparent from a reading of the following description in the light of the drawings in which:

Fig. 1 is a plan view of a field showing the mobile packing plant of the present invention thereon and illustrating the maneuverability of the latter thereover.

Fig. 2 is a perspective view of the mobile packing plant of Fig. 1.

Fig. 3 is an enlarged plan view of the mobile packing plant of Figs. 1 and 2.

Fig. 4 is a fragmentary perspective view of a portion of the packing plant shown in Fig. 3.

Fig. 5 is a transverse section through Fig. 3 taken substantially along line 5—5 thereof to illustrate the caster carriage.

Fig. 6 is a fragmentary perspective view of the caster carriage partly broken away for purposes of illustration.

Fig. 7 is a perspective view similar to that of Fig. 1 but as seen from the trailing side relative to the direction of movement of the device over a field.

Referring to the drawings the mobile packing plant generally designated 10 comprises a tractor 11 and a trailer 12 connected together by a fifth wheel or turntable arrangement 13 in a conventional manner. The trailer 12 consists of a frame 14 of a width within the maximum requirements for traveling on public highways and is of such a length as to provide room for a plurality of loading stations 15, preferably seven or thereabout for reasons which will become more apparent later in this description.

The frame 14 of the elongated trailer 12 comprises a receiving and/or loading station 16 in the form of a platform 17 just above the turntable 13 and an under-slung boom-like conveyor section 18 united with the platform 17 by downturned brackets 19 and supported at or adjacent its rearmost end on a caster carriage 20 later to be more fully explained.

The platform 17 as best illustrated in Figs. 2 and 7 is a relatively box-like frame 21 of rectangular plan, being longer in the direction of alignment thereof with the trailer section 12 and having side rails 27 to prevent men and material from falling therefrom. The platform 17 is at truckbed height from the ground to enable transfer of boxes or cartons to and from the bed of an auxiliary truck 23 traveling alongside the tractor 11 in the manner illustrated in Figs. 1 and 7. The base of the platform 17 has suitable side channels 24 joined by an end plate or web 25 to which the downturned brackets 19 are secured as by welding or the like. The lower ends of the brackets 19 support a shelf or step (not shown).

A structural member 26 (Figs. 5 and 6) extends rearwardly from the step or shelf on brackets 19 to which it is secured, to form the spine of the trailer. This structural member 26 is preferably four angle irons 27—27′ and 28—28′ at the four corners of a box girder. The angle irons 27—27′ are lowermost with their open sides out and up, while the other two angle irons 28—28′ are uppermost with their open sides in and down. These several angle irons 27—27′—28—28′ are suitably braced or joined along their length by cross bracing (not shown) in a conventional manner to form a box girder of the structural member 26 or spine of the trailer 12. At intervals along the length of this spine or girder 26 cross beams 29 are secured thereto. At their outer ends the cross beams 29 have angle irons 30 secured thereto open side in so as to cooperate with the angle irons 27—27′ of the structural member 26 for supporting the ends of boards 31 forming a catwalk 32 or 32′ on the respective sides of the trailer. From the end of each cross beam 29 there extends upwardly a plurality of pipe standards 33 to railing height relative to the catwalk 32—32′ and these pipe standards are joined by pipe hand rails 34 running parallel to the sides of the trailer 12. These pipe standards 33 on opposite sides of the trailer are braced by being joined to the ends of cross T members 35 directly above and parallel to the cross beam 29 below and terminating at the upper angle irons 28—28′ on the respective sides of the structural member 26 or spine of the trailer 12.

Between the hand rails 34 and the catwalk 32 or 32′ is another or intermediate pipe rail 36 similarly secured to the standards 33. A similar pipe rail 37 is supported at the same elevation as the intermediate pipe rail 35 by the partial cross T members 35 hereinbefore mentioned on the inner side of the respective catwalk 32 or 32′. These inner intermediate pipe rails 37 extend through the downwardly extending web of each cross T member 35 and are welded to the same.

Between the two inner intermediate pipe rails 37 a pair of angle irons 38 are secured to the T head of the cross T members 35 in spaced parallel relation to support a plurality of transverse rolls 39 for supporting the upper flight of a belt B of a conveyor 40. At the aft end of the trailer the conveyor belt B is on a roller of a suitable belt tensioning device 41. At the fore end of the trailer, i. e., adjacent the platform 17, the belt B runs around a drive roller connected to a suitable drive mechanism 42 for causing the upper reach of the belt B to travel from aft to fore end of the trailer.

At spaced intervals along the trailer, preferably at each cross beam 29 and cross T 35 thereover, an inverted U-shaped structural member 43 is incorporated to bridge over the centrally located conveyor 40. These several U-shaped bridge members 43 support on their bight portions, which are uppermost, an overhead roller conveyor O consisting of two pair of spaced angle irons 44 and 45 extending lengthwise of the trailer and each such pair of angle irons support rollers therebetween upon which empty cartons EC are supported for movement downhill from the platform 17.

At the locale of the caster carriage 20 the frame of the trailer 12 has a pair of wheel slots 46 formed therein by elimination of the catwalks 32—32′ on either side of the spine or structural member 26. In other words, the two outside angle irons 30 gap at the slots 46 so that the trailer frame narrows down to its spine width as defined by the structural member 26 at the level thereof. The hand rails 34 and intermediate pipe rails 36 and 37, however, continue on through the gaps or slots 46 and support a U-bridge 47, the legs 48 of which extend down to the respective intermediate pipe rails 36 and 37 and are welded thereto as well as to the hand rails 34. The bight portion 49 of this U bridge 47 forms a support, at its position along the length of the trailer, for the two pairs of angle irons 44 and 45 of the overhead roller conveyor "O."

At the caster slots 46 are guide tracks 50—50′ for the caster carriage 20. These guide tracks 50—50′ each comprise an angle iron 51 open side out and up and each having their ends suitably secured as by welding to an angle iron 52. The angle irons 52 at each fore and aft end of slot 46 have their ends welded to the angle irons 27—30 and 27′—30′, respectively, which support the catwalk boards 32 (see Fig. 6). Each track 50—50′ further includes a channel iron 53 having its web secured to the horizontal flange of the angle iron 51 and its parallel flanges extending downwardly therefrom. Thus the tracks so formed receive a roller wheel 54 with its periphery guided in the channel 53 below the track.

The caster carriage 20 comprises a pair of wheel bearing castings 55—55′ one on each side of the spine 26 and joined together by suitable trusswork and cross bracing 56 as best seen in Figs. 5 and 6. Each wheel bearing casting 55—55′ includes a horizontal section 57 formed integrally with a vertical section 58. The vertical section 58 of each wheel bearing casting 55—55′ is disposed just outside the respective guide track 50—50′ and within the wheel slot 46 provided.

In addition to the cross bracing 56 between the two wheel bearing castings 55—55′ the vertical sections 58 thereof are also tied together by cross bars 59. These cross bars 59 are so disposed as to provide journals for the roller wheels 54 hereinbefore mentioned. There being two such roller wheels 54 on each of the wheel bearing castings 55—55′ it will be seen that the aft end of the trailer is supported on the four roller wheels 54. In this manner the caster carriage 20 is free to move lengthwise the trailer 12.

In conjunction with the foregoing, the vertical section 58 of each wheel bearing casting 55—55′ has secured thereto an angle clip 60 directly above each roller wheel 54 and in a horizontal plane to slide upon the lower flange of the angle iron 51 formed as a part of the guide track. Thus the aft end of the trailer 12 is maintained upon the roller wheels 54 each of which is disposed to ride in its respective track channel 53 so that no lateral shifting of the caster carriage 20 will occur relative to the trailer.

The outer end of the horizontal section 57 of each wheel bearing casting 55 or 55' is provided with a suitable bearing 61 in which the shaft 62 of a caster wheel fork 63 extends. This shaft 62 is suitably secured in place relative to the horizontal section 57 of the casting 55—55' so that the fork 63 can turn in the usual manner with its axle 64 in a trailing position dependent upon the direction of rotation of the wheel W mounted on the axle 64. As seen in Fig. 5, the wheels W are running from right to left which is as seen from line 5—5 in Fig. 3. The purpose of the foregoing arrangement is to cause the two caster wheels W to travel tandem fashion down the same furrow, trench or path T between the beds on which the plants are growing. It will thus be noted that the two caster wheels W travel parallel to the rows of crops as well as the tractor 11 when at right angles to the latter.

Now assuming that all trenches T are properly spaced from one another, it would be a simple matter to fix the axis of the two trailer caster wheels W at a predetermined position laterally from the tractor. However, all rows are not necessarily uniform and in some fields the distance between rows can vary thus requiring a change of position of the caster carriage 20 along the length of the trailer 12. In Fig. 7 it will be seen that the caster wheels W travel in the ninth trench 9T from the central axis of the tractor 11 or center trench OT. Any deviation in bed width of an inch or fraction of an inch in one field relative to another will necessitate adjustment of the caster carriage lengthwise of the trailer. To this end the caster carriage 20 is movable lengthwise by reason of the roller wheel and guide track support previously explained. In conjunction therewith I have provided means 65 for shifting the caster carriage relative to the guide tracks 50—50', i. e., lengthwise of the trailer.

The means 65 for shifting the caster carriage 20 may be manually or mechanically operated as desired. For purposes of simplicity I have shown the means 65 as manually operable through the medium of a hand crank 66. As best seen in Fig. 7 the means 65 comprises a flexible linkage in the form of a chain 67 trained around two sprockets 68 and 69, one fore and the other aft of the wheel slots 46 in the framework of the trailer 12. The aft sprocket 69 is mounted on a shaft 70 suitably journaled in the frame 14 and the fore sprocket 68 is secured to a crankshaft 71 journaled in bearings 72 just ahead of the wheel slots 46 in the frame. The crank 66 or other motivating means is connected to the crankshaft 71 for turning the same in either direction to turn the fore sprocket 68 therewith. Suitable braking means or pawl and ratchet means (not shown) is provided in connection with the crankshaft 71 for holding the latter in any position to which it is turned relative to the frame 14 of the trailer 12. The chain 67 has one of its ends secured to the rearmost crossbar 59 and its opposite end secured to the foremost crossbar 59 or if desired the flexible linkage 67 may be an endless chain suitably secured to one or both of the cross bars 59 or some part of the caster carriage 20 so as to shift the latter in a fore to aft direction or vice versa relative to the frame 14 dependent upon the direction of turning of the crankshaft 71. In this manner the axis of the caster carriage 20 which is transverse to the long axis of the trailer is shifted to any desired position relative thereto for registering the caster wheels W with the trench 9T in which they are to run.

When the trailer 12 is drawn axially behind the tractor 11 for transport along a highway or road, the caster forks 63 assume a position to align the wheels W with those of the tractor. When the trailer 12 is to extend laterally of the tractor 11 the caster forks assume a position as exemplified in Figs. 5 and 6 with the wheels W in a trailing position relative to the vertical shaft 62 of the caster fork 63. In either event the forks 63 on both ends of the caster carriage 20 are secured by use of a key pin 73 inserted through aligned holes (not shown) in the fork 63 and a part of the horizontal section 57 of the wheel bearing casting 55 or 55' as the case may be.

When the caster wheel forks 63 are locked in a position to run tandem fashion in a trench spaced laterally from the tractor as illustrated in Figs. 2 and 7 it becomes necessary to secure the trailer 12 in right angle position relative to the tractor 11. To this end a stay wire or cable 74 is employed as illustrated in Figs. 1, 2 and 3. One such cable 74 is provided on each side of the trailer 12 for use on the leading side thereof as it is drawn at right angles to the tractor across the field. One end of the cable 74 is anchored as at 75 to the trailer frame 14 just ahead of the U bridge 47 and the opposite end of the cable 74 is provided with an eye or loop adapted for connection to a hook 76 on the end of the front bumper of the tractor 11. Thus in addition to the coupling of the trailer to the tractor by the turntable arrangement 13 the stay cable 74 serves to exert a pull on the trailer at a point adjacent the caster carriage 20 so that the trailer 12 will move in a forward direction with the tractor although laterally extending therefrom.

In connection with the foregoing it will be noted that the trailer section 12 is counter-balanced in a manner to relieve the load of the latter upon the caster carriage 20. This feature, as shown in Figs. 2 and 3, comprises a counterweight 77 extending cantilever fashion from the overhead supports on the box-like frame 21 on the platform 17. The counterweight 77 extends from the frame 21 in a direction opposed to the direction in which the trailer 12 extends from the platform 17. This serves to counterweigh the elongated trailer 12 relative to a fulcrum zone provided by the turntable arrangement 13 to relieve the normal tendency of the trailer to weigh downward. In addition to the foregoing, a pair of guy wires or cables 78—78' each strung between one upper corner of the frame 21 and the upper end of the leg 48 of the U bridge 47 serve to exert an upward pull upon the latter. In this manner the major load of the trailer 12 is transmitted to the bed of the tractor 12 and thus lighten the load upon the wheels W of the caster carriage 20.

Referring now to the packing equipment provided on the mobile unit above explained it will be understood that empty cartons in flat or folded condition 79 are fed from the auxiliary truck 23 onto the platform 17 (Fig. 7). These folded cartons 79 are opened up by one man and handed to a stitcher man who staples the bottom of each newly opened carton together and places such cartons EC open side up upon the upper end of the overhead roller conveyor "O." Thus the empty cartons EC line up as shown in Figs. 2 and 7 in easy reach of the packers P standing on the catwalk 32 or 32' of the trailer 12. As shown, the packers P are on the catwalk 32' which is on the trailing side of the trailer adjacent the pick up men who walk along behind the lateral trailer. These pickup men stoop down to pick up the heads of lettuce which have been previously cut and stacked by men ahead of the trailer. The cut heads of lettuce are placed upon tray-like shelves 80 which are disposed at counter height relative to the packers P on the catwalk 32'.

The tray-like shelves 80 each comprise a perforated pan 81 (Figs. 4 and 5) having one side wall secured to hook straps 82 adjacent each end thereof and braced by a diagonal bar 83 welded at its one end to the strap 82 and at its opposite end to the underside of the pan 81. Each hook strap 82 has its hooked upper end 84 disposed to hang over the hand rail 34 and its straight lower portion disposed to bear against the intermediate pipe rail 36. In this manner the shelves 80 are secured to the sides of the trailer 12 and easily removed for hanging on one or the side thereof dependent upon the direction of movement of the trailer across the field. Moreover, when the trailer is disposed in alignment with the tractor for travel down a highway the shelves 80 are removed and placed in the catwalks during transport.

This same transposability of loading equipment is true of carton holding easels 85 constituting a part of each loading station 15 hereinbefore mentioned. These carton holding easels 85 (Figs. 4 and 5) each comprise a framework made up of metal strap material. Two straps 86—86' form the foot portion of each easel 85. To these straps 86—86', four corner posts are secured, two short posts 87—88 to one strap 86 and two higher posts 87'—88' to the other strap 86'. The upper ends of posts 87—87' are joined by a side angle iron 89 flange down while the upper ends of posts 88—88' are joined by a side angle iron 89' also flange down. The two higher posts 87'—88' are joined by an aft angle iron 90 also flange down while the two shorter posts are joined by a fore angle iron 91 flange up and foremost. The upwardly extending flanges of fore and aft angle irons 90—91 are joined by straps 92—92 disposed in parallelism with the inwardly extending flanges of the side angle irons 89—89' to provide, therewith, an inclined plane 93 upon which an empty carton can be placed and supported with its fore end engaged by the upturned flange of the fore angle iron 91. Supplemental to the upturned flange on the fore angle iron an additional strap band or abutment 94 is employed to engage and support the fore side of a carton on the inclined plane 93.

These carton holding easels 85 are adapted to be disposed with their foot straps 86—86' spanning between the inner and outer intermediate pipes 36—37 on the two sides of the catwalk 32 or 32'. Thus the carton to be packed is supported at suitable height above the catwalk to facilitate placement of the heads of lettuce into the cartons by the packer man P (see for instance Figs. 2 and 7). It will be noted (Fig. 4) that the ends of the foot straps 86—86' are curved downwardly in a segmental arc to conform to the round of the pipe rails 36—37. Thus each easel 85 is held against lateral or canting shifting relative to the parallel pipe rails 36—37. However, they may be slid lengthwise upon the pipe rails 36—37, readily removed therefrom and/or replaced upon the same or those on the other side of the trailer 12 should such changeover be required.

As will be apparent from the foregoing description the easels 85 and trays 80 are always disposed on the trailing side of the trailer as it moves along the rows of crops. In this manner the heads of lettuce placed upon the trays 80 by the pick-up men in the field are at hand for the packer men P on the catwalk which is on the trailing side of the trailer. Thus the cartons taken down from the overhead conveyor O are quickly placed on the easels 85 by the packer men P and filled in a minimum of time. The filled cartons are then easily lifted from the easels 85 and placed upon the conveyor 40 which is at substantially the same level as the easel.

Although the actual packing of cartons at the several packing stations 15 is carried on at the trailing side of the trailer only, the catwalk on the opposite (fore) side thereof is clear for use by the foreman of the crew or inspector. In other words, the inspector can easily walk along such opposite catwalk supervising the workmen along the trailing side of the trailer. In this manner, the packing goes on without delay and any inferior heads of lettuce readily perceived and rejected.

The filled cartons with their open flaps out as seen in Fig. 5 travel on the conveyor 40 toward the platform 17 and upwardly onto the same as will be perceived in Fig. 4. On the platform 17 the filled cartons are conveyed through a foot press (not shown) and the upper flaps of the carton folded down over the heads of lettuce. Then while the carton is firmly held in closed position the upper flaps are secured together in any suitable manner, preferably by a pneumatic stapler (not shown).

The closed packages or cartons are next released from the foot presses and passed on to the end of the platform 17 whence they are transferred manually to the bed of the auxiliary truck 23. Thus as the empty folded cartons are unloaded from the auxiliary truck 23 and passed over to the platform 17 for opening up and stitching the filled closed cartons take their place on the auxiliary truck upon conventional pallets whereby future handling of stacks of filled cartons is facilitated in the usual manner by means of fork lifts.

The mobile packing plant 10 moves down the field in the manner as illustrated in full lines (A) in Fig. 1. At the end of the rows, usually provided with a roadway or unplanted area the cable 74 is disconnected from the hook 76 on one end of the bumper of the tractor 11. Now the tractor is driven in the path indicated by arrows —a— (Fig. 1) to align the tractor with the trailer 12. Then the entire mobile unit 10 can be backed up until the trailer 12 is disposed for travel along the next series of rows or beds of plants. In the illustration of Fig. 1 the mobile unit 10 is shown as having been pulled forward in the direction of arrows —b— until the trailer 12 is disposed for travel along the next series of beds of plants to the left of those already covered. The tractor 11 is then driven in a path substantially as indicated by arrows —c— so that the long axis of the tractor 11 is again at right angles to the trailer 12. The cable 74' on the opposite side of the trailer then has its looped end placed over the hook 76' on the opposite end of the bumper of the tractor, this time, however, in a direction opposite to that previously assumed while the unit 10 was in position A.

With the mobile unit 10 thus reversed for travel back across the field what was previously the trailing side of the trailer (catwalk 32') now becomes the leading side thereof. Consequently, the loading equipment, i. e., the trays 80 and easels 85, are transferred over to the other side of the conveyor 40 and placed on the hand rails 34, 36 and 37 boarding the catwalk 32 which is now disposed on the trailing side of the trailer 12. The mobile unit 10 is then moved slowly along the field in the same manner as heretofore explained.

While I have described my new mobile packing plant in specific detail, it will be apparent that it is susceptible to modification, alteration and/or variation without departing from the spirit of the invention. I therefore desire to avail myself of all modifications, alterations, and/or variations as fairly come within the purview of the appended claims.

What I claim as new and desire to protect by Letters Patent is:

1. A mobile packing plant adapted to travel through a field of row crops planted in beds comprising a tractor, a turntable arrangement on said tractor, an elongated trailer having one end connected to said tractor by said turntable arrangement, a caster carriage adjacent the other end of said trailer provided with dirigible caster wheels adapted to align tandum fashion for travel between rows of said crops, a counterweighted framework supported over said platform and extending cantilever fashion therefrom in a direction opposite to said elongated trailer for counterweighing the same and lightening the load thereof on said caster carriage, a stay cable connected between said other end of said trailer and the fore end of said tractor for maintaining said trailer in lateral extending relation thereto during travel thereof along said rows of plants, a carton erecting platform at one end of said trailer, an overhead conveyor extending from said platform to said other end of said trailer for feeding empty stitched cartons deposited onto the same along said trailer, a plurality of loading stations on the trailing side of said trailer each comprising an easel for supporting a carton to be packed and a shelf-like tray supported on the trailing side of said trailer for receiving and supporting cut plants manually picked up from said beds of plants, and a full carton discharge conveyor on said trailer for receiving full cartons manually placed thereon from each of said loading stations for transmitting said full cartons to said platform.

2. In a vehicle including a tractor, an elongated trailer and a fifth wheel turntable arrangement for coupling them together, a mobile packing plant comprising a caster carriage adjacent the opposite end of said trailer, caster wheels on said caster carriage adapted to assume tandum arrangement when said trailer is laterally disposed relative to said tractor, a stay cable between the opposite end of said trailer and the front end of said tractor for maintaining said trailer in lateral disposition relative to said tractor during movement thereof over beds of plants in a field, and means for facilitating longitudinal shifting of said caster carriage relative to said trailer to align said caster wheels for travel between rows of crops comprising parallel guide tracks inset inwardly from the side walls of said trailer, a pair of rollers at each side of said caster carriage for supporting each of said guide tracks, means secured to said caster carriage in overlying relation to each of said rollers for slidingly engaging the guide track adjacent the same from above for maintaining said guide tracks upon said rollers, means for securing said caster carriage at a desired position longitudinally of said guide tracks, a platform at one end of said trailer at truck bed height above said turntable arrangement, an overhead feed carriage on said elongated trailer for receiving empty cartons from the platform end thereof for transmittal along said trailer, a plurality of loading stations on the trailing side of said trailer each including an easel for supporting a carton during packing thereof, and a full carton discharge conveyor on said trailer for receiving full cartons manually deposited thereon at said loading stations and for discharging the same at said platform.

3. A mobile packing plant for use in fields planted in beds of row crops comprising a tractor, an elongated trailer, a fifth wheel turntable arrangement for coupling one end of said trailer to said tractor, a stay wire having one end connected to the front end of said tractor and its opposite end connected to the opposite end of said trailer for maintaining said trailer at right angles to said tractor for spanning a plurality of beds of plants laterally thereof, said trailer including a platform supported at truck bed height above said turntable, an underslung spinal structural member extending from said platform, and a caster carriage adjacent that end of said trailer opposite said platform comprising a pair of guide tracks secured to said spinal structural member, one on each side thereof and parallel thereto, a pair of wheel bearing castings one adjacent each of said guide tracks, a pair of rollers on each said wheel bearing casting and engaged in the guide track adjacent thereto for supporting the same, a trusswork extending across said spinal structural member for uniting said pair of wheel bearing castings together transversely of said trailer, motivating means on said spinal structural member operatively connected to said caster carriage for shifting the same longitudinally of said trailer for aligning said caster carriage with a row between beds of plants, a carton stitcher on said platform, an overhead conveyor extending from said platform to said other end of said trailer for feeding empty stitched cartons thereto, a plurality of loading stations on the trailing side of said trailer each comprising an easel for supporting a carton to be packed and a shelf-like tray supported on the trailing side of said trailer for receiving and supporting cut plants picked up from said beds of plants, and a full carton discharge conveyor on said trailer for receiving full cartons from each of said loading stations for transmitting said full cartons to said platform.

4. A mobile packing plant adapted to travel through a field of row crops planted in beds comprising a tractor, a turntable arrangement on said tractor, an elongated trailer having one end connected to said tractor by said turntable arrangement, a caster carriage adjacent the other end of said trailer provided with dirigible caster wheels adapted to align tandem fashion for travel between the beds of said row crops, a counterweighted framework supported over said platform and extending cantilever fashion therefrom in a direction opposite to said elongated trailer for counterweighing the same, a stay cable connected between said other end of said trailer and the fore end of said tractor for maintaining said trailer in lateral extending relation thereto during travel thereof along said rows of plants, a carton erecting platform at one end of said trailer, an overhead conveyor extending from said platform to said other end of said trailer for feeding empty stitched cartons thereto, a catwalk on each side of said trailer either of which becomes the trailing catwalk dependent upon whether said trailer extends to the right or left relative to said tractor, a plurality of loading stations adapted for connection to the trailing side of said trailer each comprising an easel for supporting a carton to be packed and a shelf-like tray supported on the trailing side of said trailer for receiving and supporting cut plants picked up from said beds of plants, and a full carton discharge conveyor between said catwalks on said trailer for receiving full cartons from each of said loading stations for transmitting said full cartons to said platform.

5. A mobile packing plant for use in fields planted in beds of row crops comprising a tractor, an elongated trailer, a fifth wheel turntable arrangement for coupling one end of said trailer to said tractor, a stay wire having one end connected to the front end of said tractor and its opposite end connected to the opposite ends of said trailer for maintaining said trailer at right angles to said tractor for spanning a plurality of beds of plants laterally thereof, said trailer including a platform supported at truckbed height above said turntable, an underslung spinal structural member extending from said platform, and a caster carriage adjacent that end of said trailer opposite said platform comprising a pair of guide tracks secured to said spinal structural member, and on each side thereof and parallel thereto, a pair of wheel bearing castings one adjacent each of said guide tracks, a pair of rollers on each said wheel bearing casting and engaged in the guide track adjacent thereto for supporting the same, a trusswork extending across said spinal structural member for uniting said pair of wheel bearing castings together transversely of said trailer, motivating means on said spinal structural member operatively connected to said caster carriage for shifting the same longitudinally of said trailer for aligning said caster carriage with a row between beds of plants, a catwalk on each side of said trailer pipe rails bordering each of said catwalks, a plurality of loading stations each comprising a carton supporting easel and a shelf-like tray each of which is adapted for interchangeable connection with the pipe rails bordering one or the other of said catwalks whichever is at the trailing side of said trailer dependent upon right or left hand extension of said trailer from said tractor whereby said trailer can remain in substantially the same directional disposition relative to said field although shifted relative to the rows therein.

References Cited in the file of this patent
UNITED STATES PATENTS

| 2,473,587 | Huston | June 29, 1949 |
| 2,590,965 | Huston | Apr. 1, 1952 |
| 2,699,877 | Huston | Jan. 18, 1955 |